July 16, 1957  M. M. SCHWARTZ  2,799,587
CHILDREN'S AMUSEMENT DEVICE
Filed Sept. 23, 1954
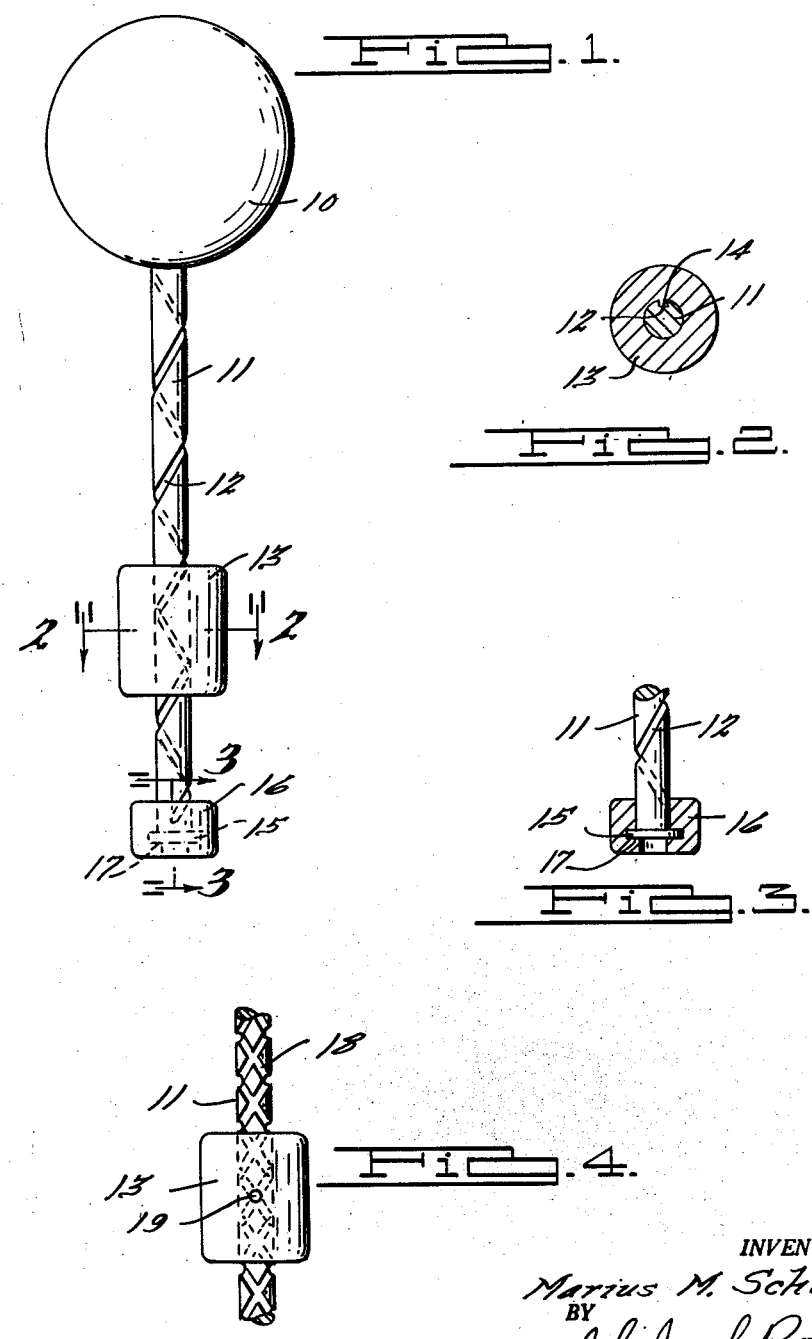
INVENTOR.
Marius M. Schwartz
BY
John Joseph Roethel
ATTORNEY.

2,799,587
Patented July 16, 1957

2,799,587
CHILDREN'S AMUSEMENT DEVICE

Marius M. Schwartz, Detroit, Mich.

Application September 23, 1954, Serial No. 457,908

1 Claim. (Cl. 99—138)

This invention relates to an amusement device for children which is in part edible and which is provided with a motion producing means adapted to further enhance the pleasure of the child during the consumption of the edible portion of the device.

More particularly the present invention relates to an improvement in lollipops or candy suckers. Lollipops commonly comprise a lump of candy on the end of a stick, the candy very often being molded in a spherical, conical or cylindrical configuration. Frequently, children, when sucking or licking on such lollipops having any of the aforementioned configurations, will twirl the stick so as to cause the candy portion to be rotated within their mouth. This is effective to cause the lollipop or sucker to be uniformly reduced in size while at the same time the twirling or rotating thereof produces a pleasurable effect for the child.

It is an object of the present invention to provide a simple and inexpensive mechanical device which may be operated to provide the desired twirling or rotating effect.

Other objects and the features of construction of this invention will appear in the following description and appended claim, reference being had to the accompanying drawing forming a part of the specification wherein like reference characters designate corresponding parts in the several views.

Fig. 1 is a side elevation of one embodiment of the present invention.

Fig. 2 is a section taken substantially along the line 2—2 of Fig. 1 looking in the direction of the arrows.

Fig. 3 is a section taken substantially along the line 3—3 of Fig. 1 looking in the direction of the arrows.

Fig. 4 is a fragmentary view showing a modification of the embodiment of the invention shown in Fig. 1.

Before explaining in detail the present invention it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Referring to the drawing, one embodiment of the present invention is illustrated in Figs. 1 to 3 inclusive. This embodiment has the general appearance of a conventional lollipop in that it comprises an edible candy portion 10 on one end of a stick or cylindrical rod 11. The edible portion 10 is preferably of a conical, cylindrical or, as shown, spherical configuration, that is, a configuration having a circular cross section in a plane normal to the longitudinal axis of the rod 11.

This rod 11 is preferably molded of a suitable plastic material and is provided with a spiral groove or thread 12 extending substantially the length thereof. A travelling nut 13 is provided which encompasses a portion of the length of the rod 11. The travelling nut 13 is provided with a means engageable with the groove or thread 12. This means may be in the form of an internal thread 14, see Fig. 2, formed in the bore of the nut 13 and projecting into the groove 12 or a pin 19 as shown in Fig. 4, securely anchored in the body of nut 14 and projecting into the groove 12.

At its lower end the rod 11 is provided with a headed portion 15. The headed portion 15 is encompassed by a collar 16 which is loosely and rotatably retained thereon in any suitable manner. As illustrated, the collar 16, which is preferably molded of plastic material, is shown as having a retainer portion or end wall section 17 which is formed after assembly of the collar on the rod 11. It will be understood that the rod 11, the collar 16 and the travelling nut 13 are preferably pre-assembled before the edible or candy portion 10 is molded onto the rod 11.

In operation, the edible or candy end portion of the present invention is placed in the mouth of the person or child desiring to consume the same and the collar 16 on the opposite end of the stick 11 is grasped with the fingers of one hand. The travelling nut 13 is held with the fingers of the other hand and is urged longitudinally of the rod 11 in one direction or the other. Through the inter-action of the nut thread 14 and the spiral groove or thread 12, the longitudinal motion of the travelling nut 13 is translated into a rotary or twirling motion of the rod 11 and the edible portion 12 thereon, the headed end of the stick rotating freely with respect to the collar 16. As the nut 13 is moved up and down the rod 11, the rod and the edible portion thereon is rotated or twirled first in one direction and then in the other.

The embodiment of the invention illustrated in Fig. 4 is provided with a more elaborate spiral groove or thread on the rod portion 11. The spiral groove or thread 18 of the present embodiment is arranged so that it is a double thread which permits reversal of the direction of motion of the travelling nut 13 while the stick and the edible portion thereon continue to rotate in the original direction of rotation.

As should be apparent from the foregoing description, the present invention provides a simple and inexpensive construction and arrangement for enhancing the appeal of the conventional lollipop to children of all ages.

I claim:

A combined toy and confection holder including an elongated rotatable rod having a longitudinal axis, a lollipop type candy on one end of said rod and shaped so as to fit within the mouth, said rod having spiral guide means formed on the peripheral surface thereof around its longitudinal axis, a tubular member longitudinally reciprocally mounted on said rod and connected to said spiral guide means for rotating said rod and said candy, said rod having at its opposite end a second member, and means for rotatably connecting the second member to the end of the rod so as to permit rotation of the rod relative to the said second member, said second member being in substantial longitudinal alignment with said candy, the parts being constructed and arranged so that, upon inserting the candy within the mouth and moving the tubular member longitudinally on said rod, the rod and candy simultaneously rotate.

References Cited in the file of this patent

UNITED STATES PATENTS

| | | |
|---|---|---|
| 943,096 | Pearce | Dec. 14, 1909 |
| 1,936,816 | Zitzman | Nov. 28, 1933 |
| 2,233,640 | Pizzarelli | Mar. 4, 1941 |
| 2,628,094 | Matrejek | Feb. 10, 1953 |
| 2,721,141 | Leinhauser | Oct. 18, 1955 |